(12) United States Patent
Si et al.

(10) Patent No.: US 10,257,860 B2
(45) Date of Patent: Apr. 9, 2019

(54) CHANNEL ACCESS FRAMEWORK FOR MULTI-BEAM OPERATION ON THE UNLICENSED SPECTRUM

(71) Applicant: Samsung Electronics Co., Ltd., Suwon-si (KR)

(72) Inventors: Hongbo Si, Garland, TX (US); Boon Loong Ng, Plano, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/789,770

(22) Filed: Oct. 20, 2017

(65) Prior Publication Data

US 2018/0115996 A1 Apr. 26, 2018

Related U.S. Application Data

(60) Provisional application No. 62/411,198, filed on Oct. 21, 2016, provisional application No. 62/572,623, filed on Oct. 16, 2017.

(51) Int. Cl.
*H04W 4/00* (2018.01)
*H04W 74/08* (2009.01)

(52) U.S. Cl.
CPC ...... *H04W 74/0816* (2013.01); *H04W 74/0808* (2013.01)

(58) Field of Classification Search
CPC .............. H04W 74/0816; H04W 74/0808
USPC ........................................... 370/329
See application file for complete search history.

(56) References Cited

U.S. PATENT DOCUMENTS

2016/0192395 A1 6/2016 Yoo et al.
2017/0208605 A1* 7/2017 Ansari .............. H04W 74/0816

FOREIGN PATENT DOCUMENTS

WO 2016045744 A1 3/2016
WO 2016048798 A1 3/2016

OTHER PUBLICATIONS

International Search Report and Written Opinion for International Application No. PCT/KR2017/011742, dated Feb. 2, 2018. (9 pages).
Kim, et al., "Adaptive Listen-Before-Talk (LBT) Scheme for LTE and Wi-Fi Systems Coexisting in Unlicensed Band", Consumer Communications & Networking Conference (CCNC), 2016 13th IEEE Annual, Jan. 9-12, 2016. (6 pages).

(Continued)

*Primary Examiner* — Marcos Batista

(57) ABSTRACT

A method of a transmit apparatus for a directional listen-before-talk (LBT) operation in a wireless communication system. The method comprising sensing a channel for an interval comprising at least one clear channel assessment (CCA) slot, determining whether a state of the sensed channel for the interval is an idle state based on a configurable directional energy threshold, sensing an additional number of CCA slots when the state of the sensed channel is determined as the idle state based on the configurable directional energy threshold, and transmitting, to a receive apparatus, at least one of discovery signal or data signal when states of the sensed additional number of CCA slots are determined as the idle state based on the configurable directional energy threshold.

20 Claims, 14 Drawing Sheets

(56) References Cited

OTHER PUBLICATIONS

Mukherjee, et al., "Licensed-Assisted Access LTE: Coexistence with IEEE 802.11 and the Evolution toward 5G", IEEE Communications Magazine (vol. 54, Issue 6, Jun. 2016), pp. 50-57, Jun. 23, 2016. (9 pages).
"3rd Generation Partnership Project; Technical Specification Group Access Network; LTE Advanced Inter-band Carrier Aggregation (CA) (3DL/3UL) (Release 13)," 3GPP TR 36.899-13, V13.0.0, Jan. 2016, 16 pages.
"Annex A (informative): Change history," 3GPP TS 36.213, Release 13, V13.2.0, Jun. 2016, pp. 371-381.
"3rd Generation Partnership Project; Technical Specification Group Radio Access Network; Evolved Universal Terrestrial Radio Access (E-UTRA); Physical Channels and Modulation (Release 13)," 3GPP TS 36.211, V13.2.0, Jun. 2016, 168 pages.
"3rd Generation Partnership Project; Technical Specification Group Radio Access Network; Evolved Universal Terrestrial Radio Access (E-UTRA); Multiplexing and Channel Coding (Release 13)," 3GPP TS 36.212, V13.2.0, Jun. 2016, 140 pages.
"3rd Generation Partnership Project; Technical Specification Group Radio Access Network; Evolved Universal Terrestrial Radio Access (E-UTRA); Physical Layer Procedures (Release 13)," 3GPP TS 36.213, V13.2.0, Jun. 2016, 6 pages.
"Foreword," 3GPP TS 36.213, Release 13, V13.2.0, Jun. 2016, pp. 7-44.
"Random Access Procedure," 3GPP TS 36.213, Release 13, V13.2.0, Jun. 2016, pp. 45-254.
"Physical Uplink Control Channel Procedures," 3GPP TS 36.213, Release 13, V13.2.0, Jun. 2016, pp. 255-334.
"UE Procedures Related to Sidelink," 3GPP TS 36.213, Release 13, V13.2.0, Jun. 2016, pp. 335-370.
"3rd Generation Partnership Project; Technical Specification Group Radio Access Network; Evolved Universal Terrestrial Radio Access (E-UTRA); Medium Access Control (MAC) Protocol Specification (Release 13)," 3GPP TS 36.321, V13.2.0, Jun. 2016, 91 pages.

\* cited by examiner

CHANNEL ACCESS FRAMEWORK FOR MULTI-BEAM OPERATION ON THE UNLICENSED SPECTRUM

CROSS-REFERENCE TO RELATED APPLICATIONS AND CLAIM OF PRIORITY

The present application claims priority to U.S. Provisional Patent Application Ser. No. 62/411,198, filed on Oct. 21, 2016 and U.S. Provisional Patent Application Ser. No. 62/572,623 filed on Oct. 16, 2017. The content of the above-identified patent document is incorporated herein by reference.

TECHNICAL FIELD

The present application relates generally to channel access operations in wireless communication systems. More specifically, this disclosure relates to channel access framework for multi-beam operation on the unlicensed spectrum in wireless communication systems.

BACKGROUND

5th generation (5G) mobile communications, initial commercialization of which is expected around 2020, is recently gathering increased momentum with all the worldwide technical activities on the various candidate technologies from industry and academia. The candidate enablers for the 5G mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on. The International Telecommunication Union (ITU) has categorized the usage scenarios for international mobile telecommunications (IMT) for 2020 and beyond into 3 main groups such as enhanced mobile broadband, massive machine type communications (MTC), and ultra-reliable and low latency communications. While all the requirements need not be met simultaneously, the design of 5G networks may provide flexibility to support various applications meeting part of the above requirements on a use case basis.

SUMMARY

The present disclosure relates to a pre-5th-Generation (5G) or 5G communication system to be provided for supporting higher data rates beyond 4th-Generation (4G) communication system such as long term evolution (LTE). Embodiments of the present disclosure provide multiple services in advanced communication systems.

In one embodiment, a transmit apparatus for a directional listen-before-talk (LBT) operation in a wireless communication system is provided. The transmit apparatus includes at least one processor configured to sense a channel for an interval comprising at least one clear channel assessment (CCA) slot, determine whether a state of the sensed channel for the interval is an idle state based on a configurable directional energy threshold, and sense an additional number of CCA slots when the state of the sensed channel is determined as the idle state based on the configurable directional energy threshold. The transmit apparatus further includes a transceiver configured to transmit, to a receive apparatus, at least one of discovery signal or data signal when states of the sensed additional number of CCA slots are determined as the idle state based on the configurable directional energy threshold.

In another embodiment, a receive apparatus for a directional listen-before-talk (LBT) operation in a wireless communication system is provided. The receive apparatus includes at least one processor configured to sense a channel for an interval comprising at least one clear channel assessment (CCA) slot, determine whether a state of the sensed channel for the interval is an idle state based on a configurable directional energy threshold, and sense an additional number of CCA slots when the state of the sensed channel is determined as the idle state based on the configurable directional energy threshold. The receive apparatus further includes a transceiver configured to receive, from a transmit apparatus, at least one of discovery signal or data signal when states of the sensed additional number of CCA slots are determined as the idle state based on the configurable directional energy threshold.

In yet another embodiment, a method of a transmit apparatus for a directional listen-before-talk (LBT) operation in a wireless communication system is provided. The method comprises sensing a channel for an interval comprising at least one clear channel assessment (CCA) slot, determining whether a state of the sensed channel for the interval is an idle state based on a configurable directional energy threshold, sensing an additional number of CCA slots when the state of the sensed channel is determined as the idle state based on the configurable directional energy threshold, and transmitting, to a receive apparatus, at least one of discovery signal or data signal when states of the sensed additional number of CCA slots are determined as the idle state based on the configurable directional energy threshold.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through FIG. 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 36.211 v13.2.0, "E-UTRA, Physical channels and modulation;" 3GPP TS 36.212 v13.2.0, "E-UTRA, Multiplexing and Channel coding;" 3GPP TS 36.213 v13.2.0, "E-UTRA, Physical Layer Procedures; 3GPP TS 36.321 v13.2.0, "E-UTRA, Medium Access Control (MAC) protocol specification;" 3GPP TS 36.331 v13.2.0, "Radio Resource Control (RRC) Protocol Specification; and" 3GPP TR 36.899 V13.0.0, "Technical Specification Group Radio Access Network, "Study on Licensed-Assisted Access to Unlicensed Spectrum."

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
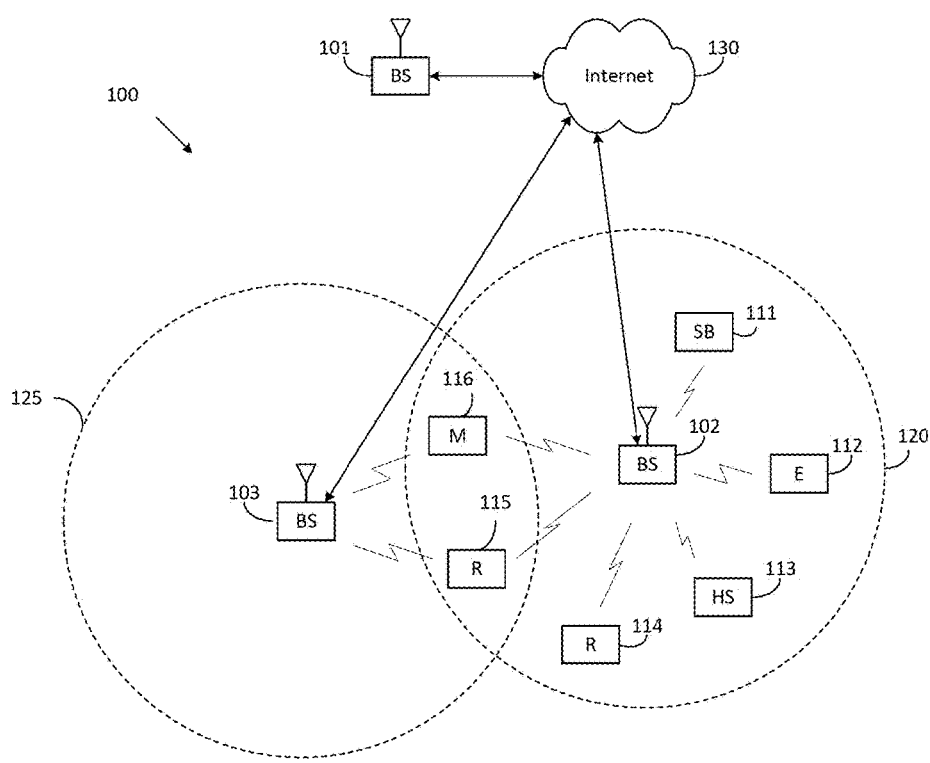
FIG. 1 illustrates an example wireless network according to embodiments of the present disclosure.
Figure 2:
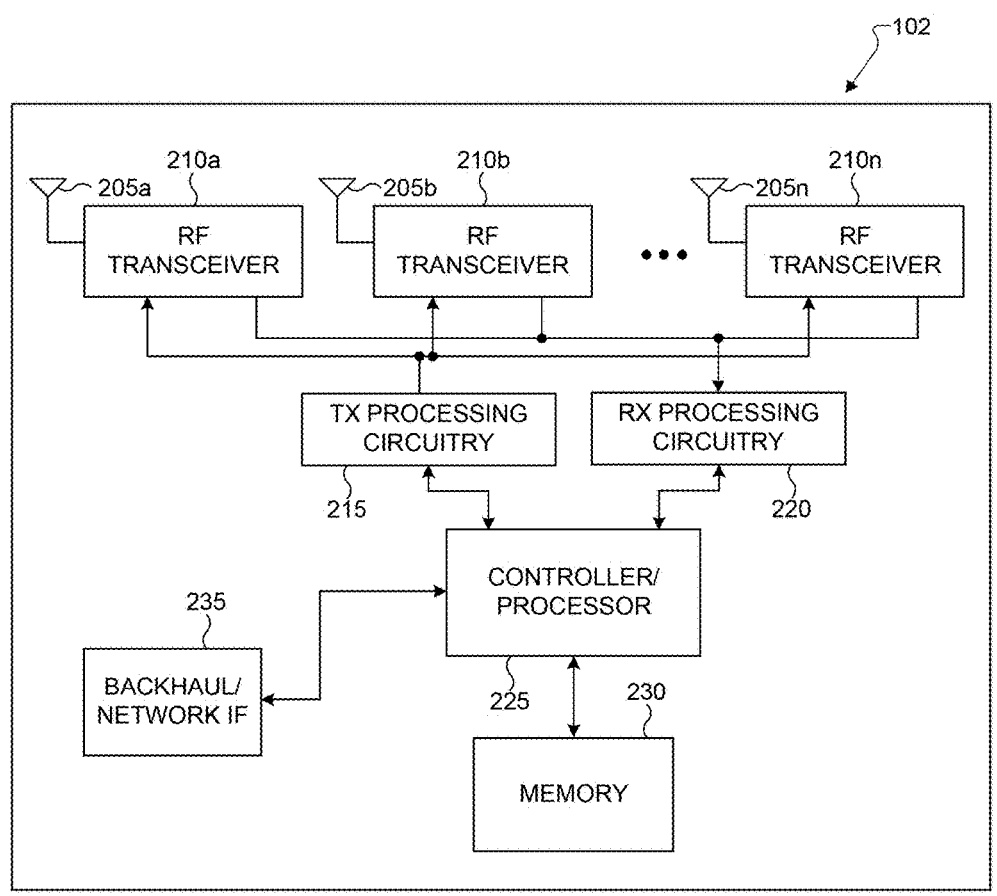
FIG. 2 illustrates an example eNB according to embodiments of the present disclosure.
Figure 3:
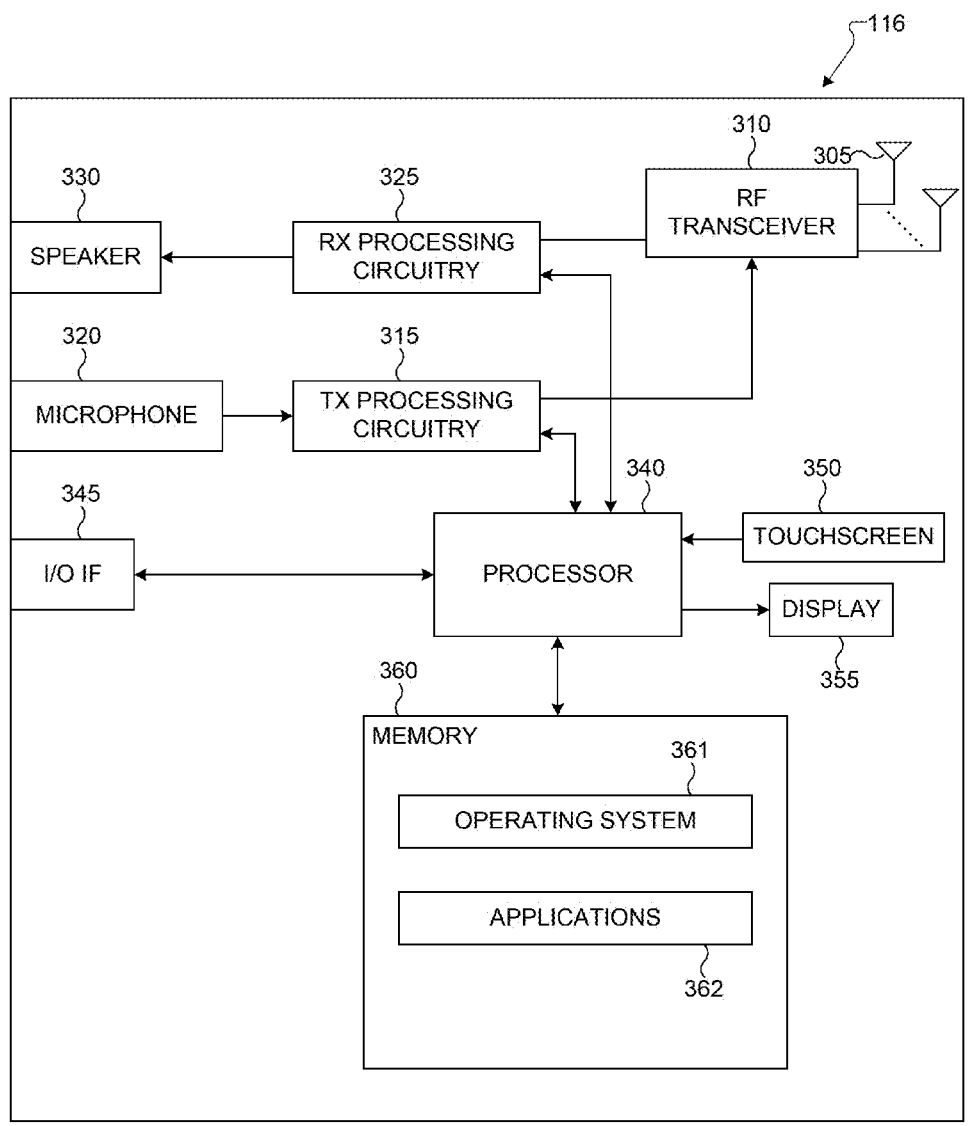
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programing, or a combination thereof, for efficient CSI reporting on PUCCH in an advanced wireless communication system. In certain embodiments, and one or more of the eNBs 101-103 includes circuitry, programing, or a combination thereof, for receiving efficient CSI reporting on PUCCH in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

In some embodiments, the RF transceiver 210a-201n is capable of transmitting at least one of discovery signal or data signal when a state of the sensed additional number of CCA slots is determined as the idle state and the state of the sensed channel for the interval is determined as the idle state.

In some embodiments, the RF transceiver 210a-201n is capable of receiving a first portion of a data transport block including a transmit time interval (TTI) within a maximum channel occupancy time (MCOT), the directional LBT operation being applied before the first portion of the data transport block, and a second portion of the data transport block for a data transmission within the MCOT comprising a set of TTIs each of which includes a beginning portion associated with another directional LBT operation.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

In some embodiments, the controller/processor 225 is capable of sensing a channel for an interval comprising at least one clear channel assessment (CCA) slot and determining whether a state of the sensed channel for the interval is an idle state, and further sensing an additional number of CCA slots when the state of the sensed channel is determined as the idle state.

In some embodiments, the controller/processor 225 is capable of determining whether the state of the sensed channel is the idle state based on a configurable energy threshold, at least one non-sensing duration included in the CCA slot, determining whether a state of the at least one sensing duration is an idle state based on a directional energy threshold, and at least one backoff counter to be used to sense the channel transmitted from one or more antenna directions, the backoff counter being configured by at least one of a pre-determined value or the transmit apparatus using a higher layer signaling.

In some embodiments, the controller/processor 225 is capable of configuring the directional energy threshold based on at least one of one or more antenna directions or a width of each of the one or more antenna directions and performing a beam sweeping when the directional LBT operation is completed at each of the set of TTIs or the group of TTIs.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

In some embodiments, the RF transceiver 310 is capable of receiving at least one of discovery signal or data signal when a state of the sensed additional number of CCA slots is determined as the idle state and when the state of the sensed channel for the interval is determined as the idle state.

In some embodiments, the RF transceiver 310 is capable of transmitting a first portion of a data transport block including a transmit time interval (TTI) within a maximum channel occupancy time (MCOT), the directional LBT operation being applied before the first portion of the data transport block, and transmitting a second portion of the data transport block for a data transmission within the MCOT comprising a set of TTIs each of which includes a beginning portion associated with another directional LBT operation.

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

In some embodiments, the processor 340 is capable of sensing a channel for an interval comprising at least one clear channel assessment (CCA) slot, determining whether a state of the sensed channel for the interval is an idle state, and sensing an additional number of CCA slots when the state of the sensed channel is determined as the idle state.

In some embodiments, the processor 340 is capable of determining whether the state of the sensed channel is the idle state based on a configurable energy threshold, determining at least one non-sensing duration included in the CCA slot, wherein the at least one non-sensing duration is immediately followed by at least one sensing duration, and determining whether a state of the at least one sensing duration is an idle state based on a directional energy threshold.

In some embodiments, the processor 340 is capable of configuring the directional energy threshold based on at least one of one or more antenna directions or a width of each of the one or more antenna directions and determining at least one backoff counter to be used to sense the channel transmitted from one or more antenna directions, the backoff counter being configured by at least one of a pre-determined value or the transmit apparatus using a higher layer signaling.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
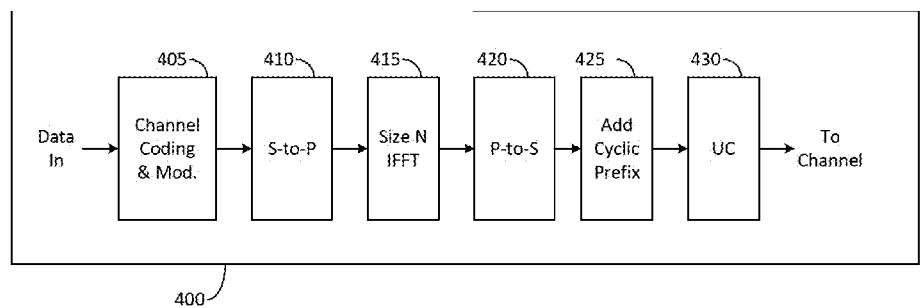
FIG. 4A illustrates an example high-level diagram of an orthogonal frequency division multiple access transmit path according to embodiments of the present disclosure.
Figure 4B:
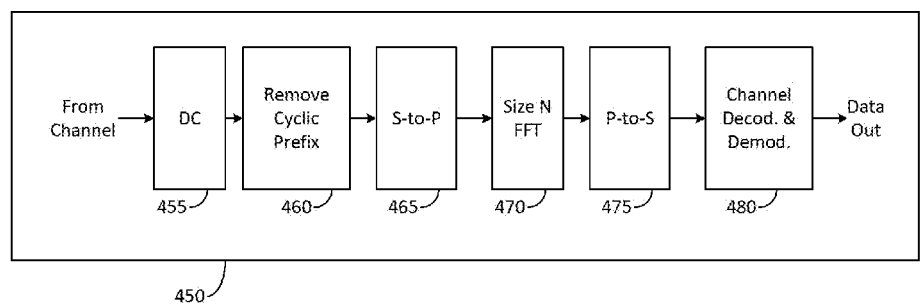
FIG. 4B illustrates an example high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

The Federal Communications Commission (FCC) defined unlicensed carriers to provide cost-free public access spectrum. Use of unlicensed carriers by a UE is allowed only under the provisions that the UE does not generate noticeable interference to communications in licensed carriers and that communications in unlicensed carriers are not protected from interference. For example, unlicensed carriers include the industrial, scientific and medical (ISM) carriers and the unlicensed national information infrastructure (UNIT) carriers that can be used by IEEE 802.11 devices. It may be possible to deploy LTE radio access technology (RAT) on an unlicensed frequency spectrum, which is also known as LTE-Unlicensed or LTE-U or licensed assisted access (LAA).

Figure 5:
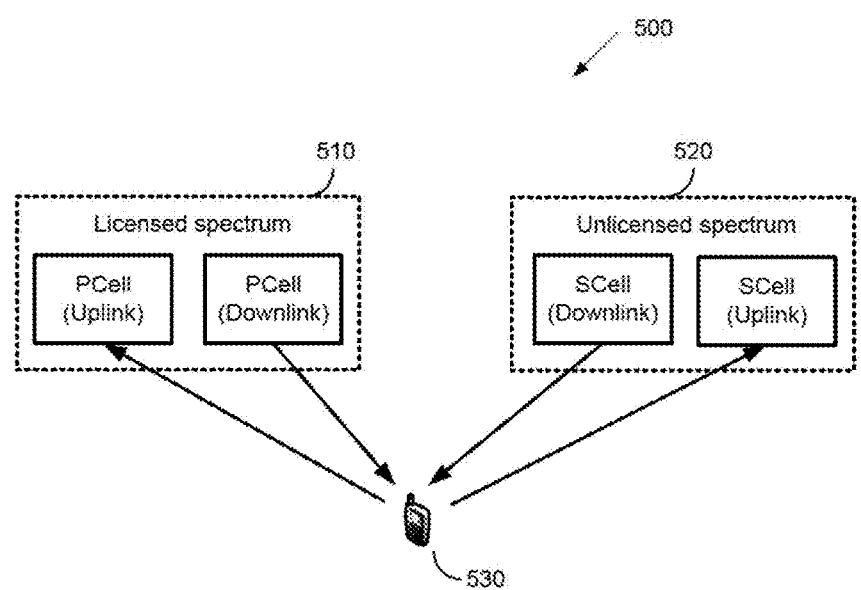
FIG. 5 illustrates an example carrier aggregation from a carrier on licensed spectrum and a carrier on an unlicensed spectrum according to embodiments of the present disclosure.

FIG. 5 illustrates an example carrier aggregation 500 from a carrier on licensed spectrum and a carrier on an unlicensed spectrum according to embodiments of the present disclosure. The embodiment of the carrier aggregation 500 illustrated in FIG. 5 is for illustration only;

A possible deployment scenario for LAA is to deploy an LAA carrier as a part of carrier aggregation (CA), where an LAA carrier is aggregated with another carrier on a licensed spectrum, as illustrated in FIG. 5. In a typical arrangement, the carrier on the licensed spectrum 510 is assigned as the primary cell (PCell) and the carrier on the unlicensed spectrum 520 is assigned as the secondary cell (SCell) for a UE 530. FIG. 5 shows an example where the LAA cell comprises of a downlink carrier together with an uplink carrier.

Figure 6:
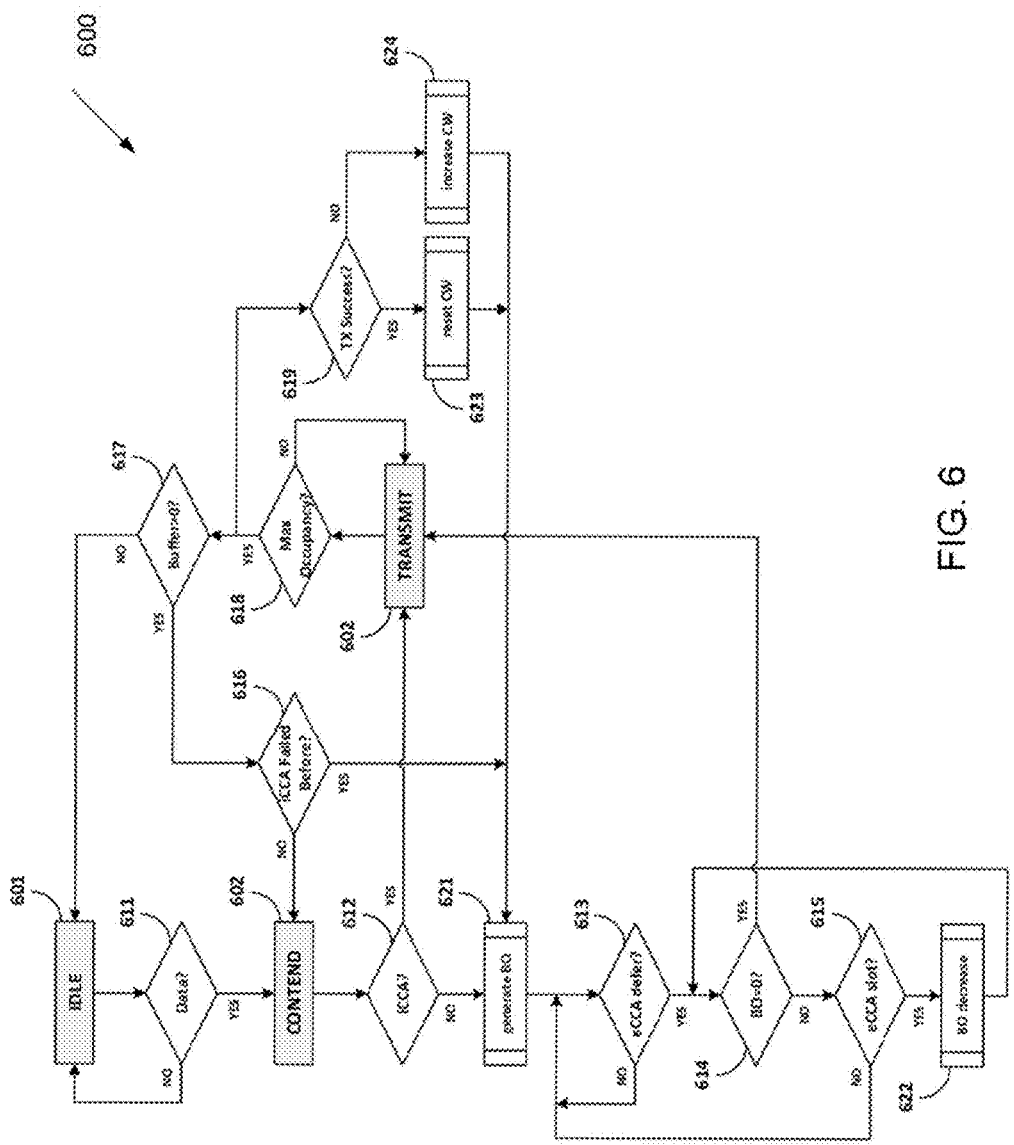
FIG. 6 illustrates a flow chart of LAA Cat4 LBT operation according to embodiments of the present disclosure.

FIG. 6 illustrates a flow chart of LAA Cat4 LBT operation 600 according to embodiments of the present disclosure. The embodiment of the flow chart of LAA Cat4 LBT operation 600 illustrated in FIG. 6 is for illustration only.

In LTE specification, it is agreed that the downlink transmission including physical downlink shared channel (PDSCH) on an LAA carrier follows the category 4 listen-before-talk (Cat4 LBT) procedures (as shown in FIG. 6): before the transmission, the eNB first performs sensing of the channel to be idle during the slot durations of a defer duration 612; and after the counter is zero 614 in step 4). The counter is adjusted by sensing the channel for additional slot duration(s) according to the steps below. In step 1, set the counter as a random number 621 uniformly distributed between 0 and contention window size (CWS), and go to step 4. In step 2, if the counter is greater than 0, and the eNB chooses to decrement the counter, decrease the counter by 1 (622). In step 3, sense the channel for additional slot duration, and if the additional slot duration is idle, go to step 4); else, go to step 5). In step 4, if the counter is 0, stop; else, go to step 2). In step 5, sense the channel until either a busy slot is detected within an additional defer duration or all the slots of the additional defer duration are detected to be idle. In step 6, if the channel is sensed to be idle during all the slot durations of the additional defer duration, go to step 4); else, go to step 5).

Figure 7:
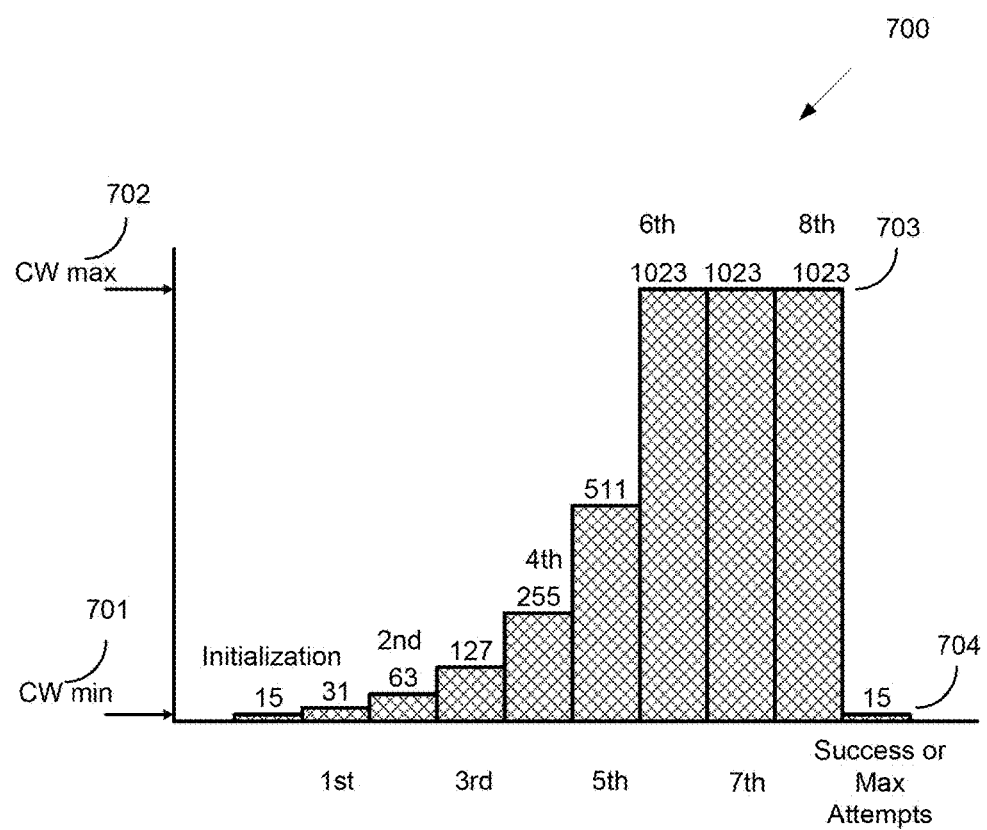
FIG. 7 illustrates an example exponential backoff scheme according to embodiments of the present disclosure.

FIG. 7 illustrates an example exponential backoff scheme 700 according to embodiments of the present disclosure. The embodiment of the exponential backoff scheme 700 illustrated in FIG. 7 is for illustration only.

The contention window size adjustment scheme is based on exponential backoff. In the backoff scheme, contention window size initializes with a predefined minimum value $CW_{min}$ and increases to the next value if the eNB chooses to increase. After reaching the predefined maximum value $CW_{max}$, the contention window size remains the same for the following transmission failures. Contention window resets to the minimum value whenever the transmission is successful, or retransmission reaches a maximum attempt. One example of the exponential adjustment scheme is illustrated in FIG. 7 Error! Reference source not found, where $CW_{min}$=15 (701), and $CW_{max}$=1023 (702), and the contention window size remains as 1023 (703) until the eNB chooses to reset the contention window size (704), e.g. transmission is successful or max attempts are reached.

In LTE specification, it is also agreed that the transmission including discovery signal but not including PDSCH on a carrier on which LAA Scell(s) transmission(s) are performed immediately after sensing the channel to be idle for at least a sensing interval and if the duration of the transmission is less than 1 ms.

Another consideration of designing channel access scheme for 5G/NR unlicensed spectrum is the coexistence issue. For example, on the 60 GHz, 802.11ad is one of the major existing RATs. The channel access is based on an enhanced distributed channel access (EDCA) where the physical carrier sensing on the PHY layer uses clear channel assessment (CCA) and virtual carrier sensing on the MAC layer uses network allocation vector (NAV). The medium is considered busy if either the physical or the virtual carrier sensing indicates the medium is as busy. A unified and flexible beamforming scheme was also defined to support transmitter and receiver beam steering. Beamforming is mandatory in 802.11ad, for both transmitter and receiver and involves sector level sweep (SLS), beam refinement protocol (BRP), and beam tracking (BT).

In SLS, the initiator of the beamforming sends training frames from each predefined sector the initiator of the beamforming wishes to train and the responder configures the responder's antenna in a quasi-omnidirectional pattern and measures the strength of received signals from different sectors. Similar, the responder sends training frames and the initiator measures them using antenna in a quasi-omnidirectional pattern. Sector sweeping feedback information is exchanged between the initiator and the responder such that both ends are capable of selecting the best sector to transmit. SLS is a high overhead procedure since a complete frame has to be transmitted for every training sector at the lowest PHY rate.

In BRP, antenna settings found during SLS using quasi-omnidirectional reception are further fine-tuned where the receiver antenna training is added to achieve the highest directional gain. The sweeping of antenna configurations can be included within one frame, such that BRP introduces significantly less overhead to beam training, compared to SLS. The SLS and BRP usually precede data transmission while BT is utilized for beamforming during data transmission. In BT, training fields are attached to the data packets in order to accommodate the changing of channels between SLS/BRP beamforming training phases. 802.11ay, expected to be released in 2017, also operates on 60 GHz as an improvement of 802.11ad and targets larger transmission rates and extended transmission distances. The likely features in 802.11ay may include channel bonding and MU-MIMO techniques which should also be taken into consideration in the design of multi-beam operation on the unlicensed spectrum.

Note that the proposed directional clear channel assessment and directional listen-before-talk (LBT) procedures hold for both downlink and uplink transmissions for multi-beam operation wireless communication systems. In one embodiment, in downlink transmissions, the transmitter(s) in the present disclosure refers to the base station(s) (e.g. eNB/gNB/TRP/AP/etc), and the receiver(s) refers to the UE(s). In another embodiment, in uplink transmissions, the transmitter(s) in the present disclosure refers to the UE(s), and the receiver(s) refers to the base station(s) (e.g. eNB/gNB/TRP/AP/etc).

In the omni-directional transmission based system on the unlicensed spectrum, e.g. LAA on 5 GHz, clear channel assessment (CCA) is performed in an omni-directional manner by detecting the received energy power from all directions. By performing CCA, the transmitter is capable of sensing the interference of ongoing transmissions from other nearby nodes. If the energy detected in CCA exceeds a predefined threshold, the transmitter claims the channel as busy and suspends the potential transmission; if the energy detected in CCA does not exceed the predefined threshold, the transmitter claims the channel as clean and proceeds with the remaining listen-before-talk (LBT) procedure.

Figure 8:
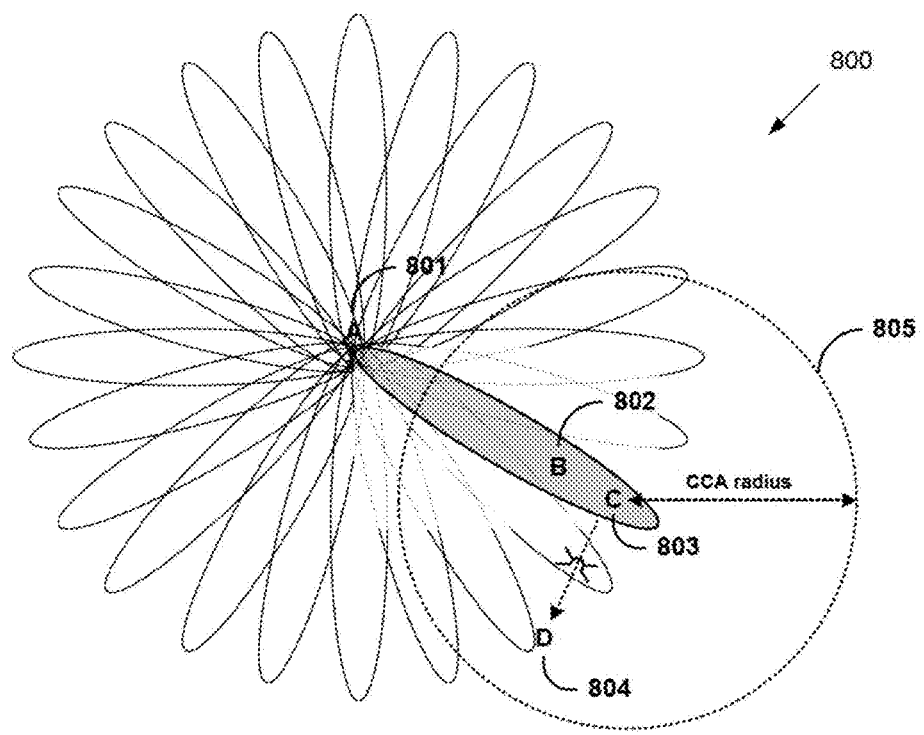
FIG. 8 illustrates an example false alarm of the omnidirectional CCA according to embodiments of the present disclosure.

FIG. 8 illustrates an example false alarm of the omni-directional CCA 800 according to embodiments of the present disclosure. The embodiment of the false alarm of the omni-directional CCA 800 illustrated in FIG. 8 is for illustration only.

The omni-directional CCA sensing can also be utilized for multi-beam operation transmissions. For example, 802.11ad performs omni-directional CCA before beamformed transmissions on the 60 GHz band. However, by performing the omni-directional CCA, the channel access opportunity can be reduced due to false alarms. For example, as illustrated in FIG. 8, node A 801 transmits to node B 802 in a beamformed pattern. Node C 803 locates along the transmission direction from node A to node B, and prepares to transmit to node D 804, where node D does not locate in the direction from node A to node B. If node C performs an omni-directional CCA 805, the received energy power from the ongoing transmission from node A to node B can exceed the CCA threshold and the node C chooses to suspend the transmission to node D due to failed CCA. However, the transmission from node C to node D may not have significant impact to the transmission from node A to node B. In this sense, the omni-directional CCA generates false alarms, and this issue only holds for multi-beam operation transmissions.

To solve this issue, the present disclosure proposes the directional clear channel assessment scheme, where the antennas to perform channel sensing at the transmitter is configured to be directional, and the energy detected is along the preconfigured sensing direction(s) with preconfigured sensing angle(s).

In one embodiment, the transmitter antennas can be configured to sense from one direction for a sensing duration $T_s$. The center sensing direction $D_s$ can be configured by the transmitter performing directional CCA from a set of predefined directions. The sensing angle/width $A_s$ (note that there can be two angles defined to cover 3D space, e.g. azimuth angle and elevation angle, both contained in $A_s$) can also be configured by the transmitter performing CCA from a set of predefined angles. A sensing duration $T_s$ is considered to be idle for direction $D_s$ with angle $A_s$, if the transmitter senses the channel during the sensing duration and the power detected by the transmitter is less than the directional energy detection threshold $X_{Thresh}-Y(D_s, A_s)$ dBm. Otherwise, the sensing duration $T_s$ is considered to be busy for direction $D_s$ with angle $A_s$. $X_{Thresh}$ is the CCA energy detection threshold for omni-directional transmission scenario, and $Y(D_s, A_s)$ is the threshold gap on direction $D_s$ with angle $A_s$ for directional CCA from omni-directional CCA, which is related to the sensing center direction and sensing angle/width (note that $Y(D_s, A_s)$ can be either positive, zero, or negative).

In one example, $X_{Thresh}$ can utilize the CCA threshold from LTE LAA/eLAA, which is specified in LTE specification. The energy detection threshold takes into account the impacts from transmission power, transmission bandwidth, regulation, and transmission context (data or discovery signal only).

In another example, $X_{Thresh}$ can be a newly designed parameter, which also takes into account the impacts from transmission power, transmission bandwidth, regulation, and transmission context (data or discovery signal only). Other factors can also contribute to $X_{Thresh}$. Note that, the parameters of directional CCA can be configured such that the CCA is performed in a quasi-omni-directional or omni-directional pattern. In this sense, quasi-omni-directional or omni-directional CCA is a special case of directional CCA, and $Y(D_s, A_s)=0$ for quasi-omni-directional or omni-directional CCA.

In some embodiments, the transmitter antennas can be configured to sense from multiple directions (e.g. $N_s$ directions) at the same time for a sensing duration $T_s$. For example, the transmitter antennas can allocate on multiple antenna panels. The center sensing directions $\vec{D}_s=(D_{s,1}, \ldots D_{s,N_s})$ can be configured independently or dependently by the transmitter performing directional CCA from a set of predefined directions. The sensing angles/widths $\vec{A}_s = (A_{s,1}, \ldots A_{s,N_s})$ (note that there can be two angles defined to cover 3D space, e.g. azimuth angle and elevation angle, both contained in $\vec{A}_s$) can also be configured by the transmitter performing CCA from a set of predefined angles.

In one embodiment, a sensing duration $T_s$ is considered to be idle for direction $D_{s,i}$ with angle $A_{s,i}$, if the transmitter senses the channel during the sensing duration and the power detected by the transmitter is less than the directional energy detection threshold $X_{Thresh} - Y'(N_s, \vec{D}_s, \vec{A}_s, D_{s,i}, A_{s,i})$ dBm. Otherwise, the sensing duration $T_s$ is considered to be busy for direction $D_{s,i}$ with angle $A_{s,i}$. $X_{Thresh}$ is the CCA energy detection threshold for omni-directional transmission scenario (examples from the last embodiment also apply here), and $Y'(N_s, \vec{D}_s, \vec{A}_s, D_{s,i}, A_{s,i})$ is the threshold gap for directional CCA on direction $D_{s,i}$ with angle $A_{s,i}$ from omni-directional CCA. Note that $Y'(N_s, \vec{D}_s, \vec{A}_s, D_{s,i}, A_{s,i})$ can be either positive, zero, or negative.

In another embodiment, a sensing duration $T_s$ is considered to be idle for all directions $\vec{D}_s$ with angles $\vec{A}_s$, if the transmitter senses the channel during the sensing duration and the power detected by the transmitter is less than the directional energy detection threshold $X_{Thresh} - Y''(N_s, \vec{D}_s, \vec{A}_s)$ dBm. Otherwise, the sensing duration $T_s$ is considered to be busy for direction $\vec{D}_s$ with angles $\vec{A}_s$. $X_{Thresh}$ is the CCA energy detection threshold for omni-directional transmission scenario (examples from the last embodiment also apply here), and $Y''(N_s, \vec{D}_s, \vec{A}_s)$ is the threshold gap for directional CCA on directions $\vec{D}_s$ with angles $\vec{A}_s$ from omni-directional CCA. Note that $Y''(N_s, \vec{D}_s, \vec{A}_s)$ can be either positive, zero, or negative.

Note that $Y'(N_s, \vec{D}_s, \vec{A}_s, D_{s,i}, A_{s,i})$ and $Y''(N_s, \vec{D}_s, \vec{A}_s)$ can be related, and both related to $Y(D_s, A_s)$ as well. For example, $Y(D_s, A_s)$ can be a special case of $Y'(N_s, \vec{D}_s, \vec{A}_s, D_{s,i}, A_{s,i})$ and $Y''(N_s, \vec{D}_s, \vec{A}_s)$ when $N_s = 1$.

Figure 9:
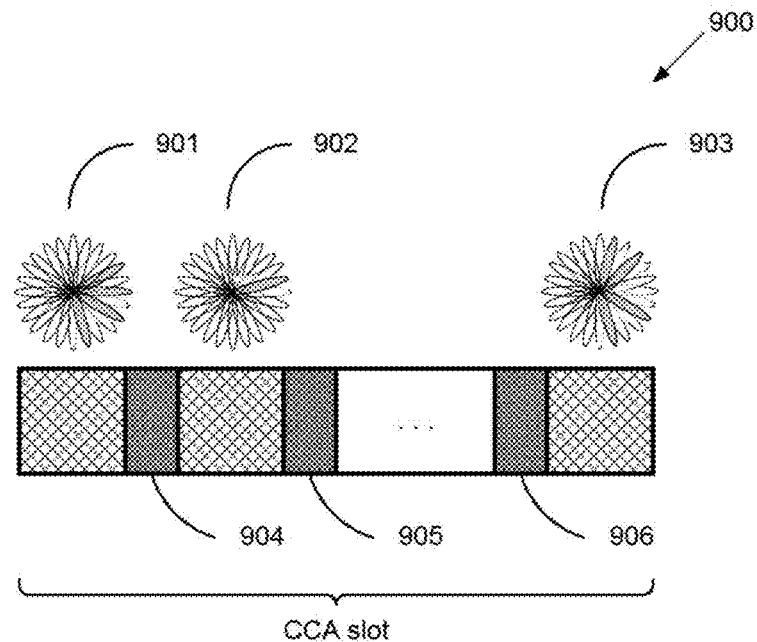
FIG. 9 illustrates an example directional CCA slot according to embodiments of the present disclosure.

FIG. 9 illustrates an example directional CCA slot 900 according to embodiments of the present disclosure. The embodiment of the directional CCA slot 900 illustrated in FIG. 9 is for illustration only.

The CCA slot includes at least $N_s \geq 1$ sensing durations (901, 902, 903), and $N_{sw} \geq 0$ sensing switch durations (904, 905, 906) between sensing durations (may also be combined with gaps without sensing). The duration of a CCA slot $T_{slot}$ is at least $N_s \cdot T_s + N_{sw} \cdot T_{sw} + T_{ns}$, where $T_s$ is the sensing duration, $T_{sw} \geq 0$ is the sensing switch duration, and $N_{sw} \geq 0$ is the number of sensing switch duration (for example, $N_{sw} = N_s - 1$, or $N_{sw} < N_s - 1$), and $T_{ns} \geq 0$ is other possible non-sensing duration. Note that a special case is, only single sensing duration within the CCA slot, and no sensing switch duration exists ($T_{sw} = 0$, $N_s = 1$). In each of the sensing duration, the transmitter performing CCA can be configured to sense from one direction (902) or multiple directions (901, 903), as mentioned in previous embodiments.

In one sub-embodiment, the sensing areas (determined by the sensing center direction and sensing angle/width) in different sensing durations within the same CCA slot can be non-overlapping (e.g. 901 and 902). In another sub-embodiment, the sensing areas (determined by the sensing center direction and sensing angle/width) in different sensing durations within the same CCA slot can overlap with each other (e.g. 901 and 903).

In one sub-embodiment, the sensing directions keep a predefined or configured scanning order of the directions (e.g. same across multiple CCA slots). In another sub-embodiment, the sensing directions are randomly chosen in each CCA slot.

In the classical channel access for unlicensed spectrum, e.g. on 5 GHz band, omni-directional CCA based listen-before-talk (LBT) is mandatory before occupying the channel. However, the same channel access procedure may not be effective or efficient for multi-beam operation system, e.g. on 60 GHz unlicensed band or multi-beam 5 GHz band. For example, in LAA downlink, UEs within the same cell share the same LBT parameters including the contention window size (CWS), which is unfair among UEs with different transmission capabilities and channel conditions. To solve this issue, directional LBT, possibly combined with omni-directional LBT, based channel access framework is proposed in the present disclosure.

Multi-beam operation system can support one or multiple of the following types of direction LBT schemes on the licensed spectrum. Assume the LBT is associated with one or multiple sensing directions $D_1, \ldots, D_M$, where $M \geq 1$, and each sensing direction can cover one or multiple receivers. Note that omni-directional LBT can also be considered as a special case of single direction ($M=1$). The following two types of LBT are considered.

In one embodiment of type A, sense the channel for a sensing interval $T_{d,A}$, which includes a duration $T_f$ (no sensing in this duration) immediately followed by one or more CCA slots (where the number of CCA slots is predefined or configured, and each with duration $T_{slot}$, and directional/omni-directional CCA is performed in the slots). If there are more than one CCA slots, each of the slots senses all directions $D_1, \ldots, D_M$, and the configuration of directions (number of sensing durations, and directions to sense within each duration) within each CCA slots can be common or different. The type A LBT is considered to be completed for all receivers/directions sensed in this LBT, if all the sensing slots are detected to be idle for all receivers/directions sensed in this LBT. The type A LBT is considered to be completed for some particular receivers and/or directions sensed in this LBT, if all the sensing slots are detected to be idle for those particular receivers/directions sensed in this LBT.

In one embodiment of type B, sense the channel for a sensing interval $T_{d,B}$, which includes a duration $T_f$ (no sensing in this duration) immediately followed by one or more CCA slots (each with duration $T_{slot}$, and directional/omni-directional CCA is performed in the slots), and if the sensing interval $T_{d,B}$ is detected to be idle, continue sensing the channel for a series of CCA slots (the number of sensing slots following is also known as the backoff counter). Each of the slots (including the slots in $T_{d,B}$ and slots following $T_{d,B}$) senses all directions $D_1, \ldots, D_M$, and the configuration of directions (number of sensing durations, and directions to sense within each duration) within each CCA slots can be common or different. The type B LBT is considered to be completed for all receivers/directions sensed in this LBT, if all the sensing slots are detected to be idle for all receivers/directions sensed in this LBT. The type B LBT is considered to be completed for some particular receivers/directions sensed in this LBT, if all the sensing slots are detected to be idle for those particular receivers/directions sensed in this LBT. The generation of backoff counter can be based on one or multiple of the following embodiments.

In one embodiment, for every sensing direction or group of directions $D_m$, the transmitter generates and maintains a backoff counter $N_m$ (in this sense, backoff counter is direction-specific/group-of-direction-specific or equivalently, receiver or group-of-receiver specific), where $N_m$ is initialized as a random integer uniformly generated between 0 and the contention window size CW (in this sense, contention window size is common for all directions/receivers), and $N_m=N_m-1$ if the CCA slot is detected to be idle on direction or group of directions m.

In another embodiment, for every sensing direction or group of directions $D_m$, the transmitter generates and maintains a backoff counter $N_m$ (in this sense, backoff counter is direction-specific/group-of-direction-specific or equivalently, receiver or group-of-receiver specific), where $N_m$ is initialized as a random integer uniformly generated between 0 and the contention window size $CW_m$ (in this sense, contention window size is direction-specific/group-of-direction-specific or equivalently, receiver or group-of-receiver specific), and $N_m=N_m-1$ if the CCA slot is detected to be idle on direction or group of directions m.

In yet another embodiment, the transmitter generates and maintains a common backoff counter N (in this sense, backoff counter is common for all directions/receivers), where N is initialized as a random integer uniformly generated between 0 and the contention window size CW (in this sense, contention window size is common for all directions/receivers), and N=N −1 if the CCA slot is detected to be idle for all sensed directions.

In yet another embodiment, the transmitter generates and maintains a common backoff counter N (in this sense, backoff counter is common for all directions/receivers), where N is initialized as a random integer uniformly generated between 0 and a value $\overline{CW}$, and $\overline{CW}$ is calculated from contention window sizes $CW_1, \ldots, CW_M$ (in this sense, contention window size is direction-specific/group-of-direction-specific or equivalently, receiver or group-of-receiver specific), and N=N−1 if the CCA slot is detected to be idle for all sensed directions. Note that in one example, $CW_1, \ldots, CW_M$ can be the same for all directions, which means all directions utilize the same contention window size.

The adjustment of contention window size(s) can be based on one or multiple of the following schemes. In one example, the common contention window size is fixed. In another example, the direction-specific/group-of-direction-specific contention window size is fixed for each direction or group of directions. In yet another example, the common contention window size $\overline{CW}$ is maintained at the transmitter side, and is adjusted from a set of predefined values using the following steps. In such example, initialize as the minimum predefined value $\overline{CW}_{min}$; and increase to the next higher predefined value if the transmitter chooses to increase the predefined value (if the maximum predefined value $\overline{CW}_{max}$ is achieved, remain the same value); otherwise, reset to the minimum predefined value $\overline{CW}_{min}$.

In yet another example, the direction-specific/group-of-direction-specific contention window size $CW_m$ is maintained at the transmitter side, and is adjusted from a set of direction-specific predefined values using the following steps (minimum and maximum predefined values can be different across directions). In such example, initialize as the minimum predefined value $CW_{m,min}$; and increase to the next higher predefined value if the transmitter chooses to increase the predefined value (if the maximum predefined value $CW_{m,max}$ is achieved, remain the same value); otherwise, reset to the minimum predefined value $CW_{m,min}$.

In yet another example, the direction-specific/group-of-direction-specific contention window size $CW_m$ is maintained at the receiver side, and is adjusted from a set of direction-specific predefined values using the following steps (minimum and maximum predefined values can be different across directions). In such example, initialize as the minimum predefined value $CW_{m,min}$; and increase to the next higher predefined value if the receiver chooses to increase predefined value (if the maximum predefined value $CW_{m,max}$ is achieved, remain the same value); otherwise, reset to the minimum predefined value $CW_{m,min}$.

The transmitter may sense all transmission directions in the transmission duration before channel access. For example, if the transmitter is scheduled to transmit to multiple receivers in the transmission durations using beamforming, the LBT before this transmission duration can be (quasi-)omni-directional ((quasi-)omni-directional LBT is considered to contain all directions), or directional containing all beamformed directions to the scheduled receivers. Directions not sensed in the LBT procedure cannot be chosen for beamformed transmission directions in the corresponding transmission duration.

One or multiple of the following directional LBT based schemes or their combinations can be utilized for transmission including downlink or uplink data transport blocks in multi-beam operation system. In one embodiment, scheme(s) supported may depend on the transmitter's capability of the antenna configurations, e.g. the angle and width of the transmitting and receiving antenna, and transmission power. For example, if a transmitter is only capable of performing omni-directional transmission, beamforming based directional LBT cannot be adopted for the transmitter. For another example, the transmitter can utilize the beamforming based directional LBT only if the antenna can be configured to transmit/receive in a narrow beam with beam width/angle smaller than a threshold. If multiple schemes are supported, the transmitter can choose to switch among the schemes.

Figure 10:
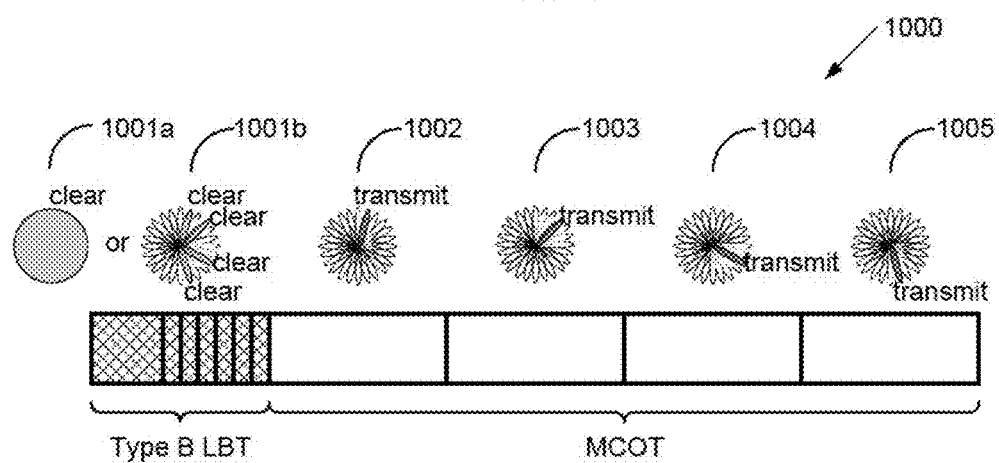
FIG. 10 illustrates an example directional LBT based transmission including data transport block according to embodiments of the present disclosure.

FIG. 10 illustrates an example directional LBT based transmission including data transport block 1000 according to embodiments of the present disclosure. The embodiment of the directional LBT based transmission including data transport block 1000 illustrated in FIG. 10 is for illustration only.

In one embodiment of scheme 1, the transmitter may transmit (1002, 1003, 1004, 1005) for a maximum channel occupancy time (MCOT) after omni-directional LBT or Type B directional LBT (1001a or 1001b) completes wherein all the scheduled transmission directions within the MCOT are sensed to be clear. FIG. 10 illustrates an example, and note that transmission direction may not be limited to one within each transmission block, although the figure only illustrates one.

Figure 11:
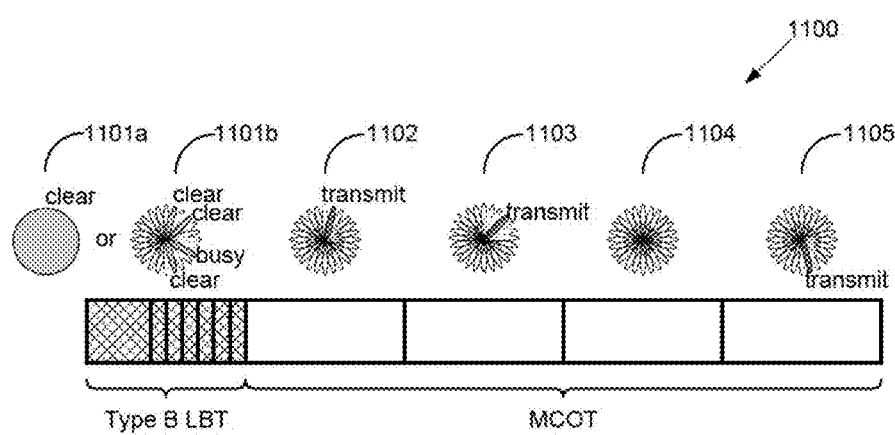
FIG. 11 illustrates another example directional LBT based transmission including data transport block according to embodiments of the present disclosure.

FIG. 11 illustrates another example directional LBT based transmission including data transport block 1100 according to embodiments of the present disclosure. The embodiment of the directional LBT based transmission including data transport block 1100 illustrated in FIG. 11 is for illustration only.

In one embodiment of scheme 2, the transmitter may transmit on some of the scheduled transmission directions within the MCOT for a maximum channel occupancy time (MCOT) (1102, 1103, 1105) after omni-directional LBT or Type B directional LBT completes for those directions (801a or b, e.g. all scheduled directions within the following transmission burst are sensed but only part of the directions are detected to be clear). In this scheme, if multiple backoff counters exit, self-defer (ranging from 0 to a predefined value) or maximum backoff time can be introduced to facilitate the alignment of transmission starting time of different directions. In one embodiment, for those directions detected to be busy, the transmitter can reschedule the transmission block to transmit to other directions detected to be clear. In another embodiment, for those directions detected to be busy, the transmitter can leave the transmission block as empty (1104). The difference between Scheme 1 and Scheme 2 is that Scheme 1 only allows transmission after successful LBT for all scheduled directions, while Scheme 2 allows transmission to a subset of scheduled transmission directions after successful LBT for those particular directions. In this sense, Scheme 1 can be considered as a special case of Scheme 2. FIG. 11 illustrates an example for Scheme 2, and note that transmission direction may not be limited to one within each transmission block, although the figure only illustrates one.

Figure 12:
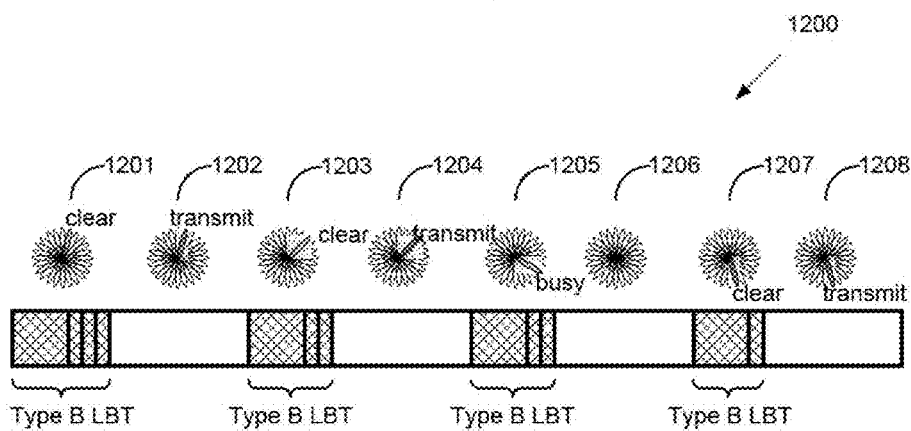
FIG. 12 illustrates yet another example directional LBT based transmission including data transport block according to embodiments of the present disclosure.

FIG. 12 illustrates yet another example directional LBT based transmission including data transport block 1200 according to embodiments of the present disclosure. The embodiment of directional LBT based transmission including data transport block 1200 illustrated in FIG. 12 is for illustration only.

In one embodiment of scheme 3, the transmitter may transmit (1202, 1204, 1208) for one or multiple TTIs within the MCOT after Type B directional LBT (1201, 1203, 1207) completes wherein all the scheduled transmission directions within the following transmission duration (e.g. one or multiple TTIs) are sensed to be clear. The contention window size of the Type B directional LBT in Scheme 3 can be smaller than the one in Scheme 1 and 2. For one example, the contention window size in Scheme 3 can be with higher priority class comparing to the one in Scheme 1 and 2. For another example, the contention window size in Scheme 3 can be chosen as the one in Scheme 1 and 2 timed by a factor, where the factor is the ratio of transmission duration in Scheme 3 to the MCOT (rounding to the nearest predefined contention window size value may be applied). The exact value of contention window size can be determined with consideration of the fair coexistence with other RAT on the same spectrum. FIG. 12 illustrates an example, and note that transmission direction may not be limited to one within each transmission block, although the figure only illustrates one, and LBT parameters before transmission and transmission durations may not be the same for different transmission blocks.

If the directional LBT cannot complete (sensed to be busy) for some directions (1205), the transmitter cannot transmit to these directions in the following transmission duration (e.g. one or multiple TTIs). In one embodiment, the transmitter can still transmit on the remaining directions on which directional LBT completes, and those scheduled resources for transmission to directions detected to be busy can be left as empty or can be rescheduled for the transmission to the directions detected to be clear if possible. In another embodiment, the transmitter cannot transmit along any directions sensed within the LBT.

Figure 13:
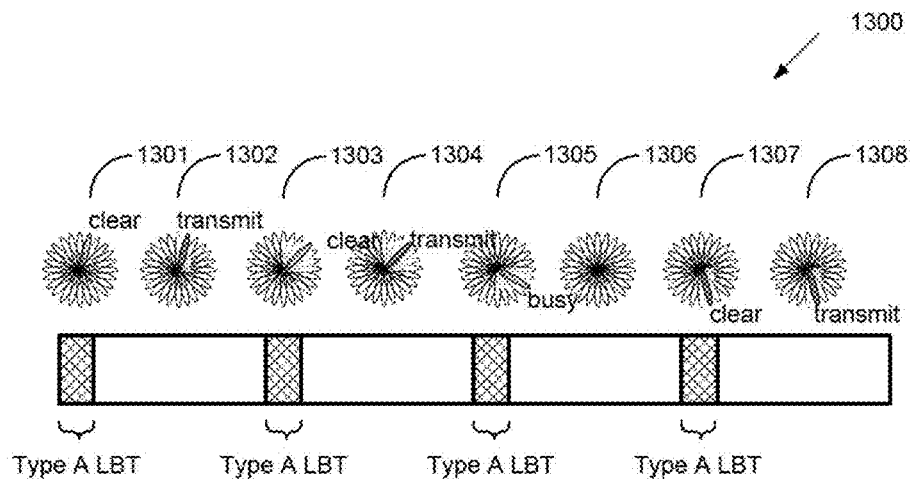
FIG. 13 illustrates yet another example directional LBT based transmission including data transport block according to embodiments of the present disclosure.

FIG. 13 illustrates yet another example directional LBT based transmission including data transport block 1300 according to embodiments of the present disclosure. The embodiment of the directional LBT based transmission including data transport block 1300 illustrated in FIG. 13 is for illustration only.

In one embodiment of scheme 4, the transmitter may transmit (1302, 1304, 1308) for one or multiple TTIs within the MCOT after Type A directional LBT (1301, 1303, 1307) completes wherein all the scheduled transmission directions within the following transmission duration (e.g. one or multiple TTIs) are sensed to be clear. For one example, the transmission duration after each Type A LBT can be fixed to be one TTI. For another example, the transmission duration after each Type A LBT can be configurable, and a variation to this example is adjusting the length of Type A LBT based on the transmission duration (e.g. if transmission duration is X TTI, the length of Type A LBT is configured to be X times the length of Type A LBT for one TTI transmission duration). FIG. 13 illustrates an example, and note that transmission direction may not be limited to one within each transmission block, although the figure only illustrates one, and LBT parameters before transmission and transmission durations may not be the same for different transmission blocks.

If the directional LBT cannot complete (sensed to be busy) for some directions (1305), the transmitter cannot transmit to these directions in the following transmission duration (e.g. one or multiple TTIs). In one embodiment, the transmitter can still transmit on the remaining directions on which directional LBT completes, and those scheduled resources for transmission to directions detected to be busy can be left as empty or can be rescheduled for the transmission to the directions detected to be clear if possible. In another embodiment, the transmitter cannot transmit along any directions sensed within the LBT.

Figure 14:
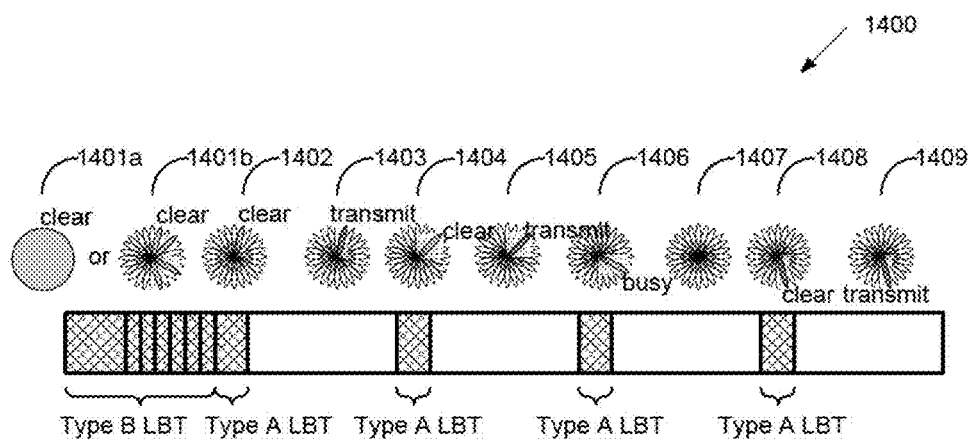
FIG. 14 illustrates yet another example directional LBT based transmission including data transport block according to embodiments of the present disclosure.

FIG. 14 illustrates yet another example directional LBT based transmission including data transport block 1400 according to embodiments of the present disclosure. The embodiment of the directional LBT based transmission including data transport block 1400 illustrated in FIG. 14 is for illustration only.

In one embodiment of scheme 5, the transmitter may transmit (1403, 1405, 1409) within the MCOT after a combination of Type B directional LBT (1401*b*) or (quasi-) omni-directional LBT (1401*a*) before the MCOT and Type A LBT before each TTI within the MCOT (1402, 1404, 1408) both complete wherein all the scheduled transmission directions within the Type B directional LBT or (quasi-) omni-directional LBT before the MCOT are sensed to be clear, and all directions in Type A LBT before each TTI within the MCOT are sensed to be clear. In one embodiment, the choice of Type B directional LBT or (quasi-) omni-directional LBT before the MCOT can be up to transmitter's decision (possibly using the same or different LBT parameters). For example, if the transmitter is aware of all possible directions scheduled for transmission within MCOT, the transmitter can utilize the Type B directional LBT to detect all possible directions scheduled for transmission within MCOT, otherwise, the transmitter can utilize the (quasi-) omni-directional LBT to detect all directions. In another embodiment, either Type B directional LBT or (quasi-) omni-directional LBT before the MCOT is utilized. FIG. 14 illustrates an example, and note that transmission direction may not be limited to one within each transmission block, although the figure only illustrates one.

If the Type A directional LBT before TTI cannot complete (sensed to be busy) for some directions (1306), the transmitter cannot transmit to these directions in the following TTI. In one embodiment, the transmitter can still transmit on the remaining directions on which directional LBT completes, and those scheduled resources for transmission to directions detected to be busy can be left as empty or can be rescheduled for the transmission to the directions detected to be clear if possible. In another embodiment, the transmitter cannot transmit along any directions sensed within the LBT.

In the classical initial access for unlicensed spectrum, e.g. on 5 GHz band, a transmission of discovery signals but not including data transport blocks are performed immediately after sensing the channel to be idle for at least a sensing interval. In multi-beam operation based unlicensed spectrum, e.g. on 60 GHz band or multi-beam 5 GHz band, the gNB performs a beam sweeping for the transmission of synchronization signals, where the discovery signals are transmitted multiple times in time domain to guarantee large enough coverage.

One or multiple of the following directional LBT based schemes can be utilized for transmission including discovery signals or synchronization signals, potentially multiplexed with other broadcasting signals (e.g. PBCH, RMSI, OSI), but not including other data transport block in multi-beam operation system. In one embodiment, scheme(s) supported may depend on the transmitter's capability of the antenna configurations, e.g. the angle and width of the transmitting and receiving antenna, and transmission power. For example, if a transmitter is only capable of performing omni-directional transmission, beamforming based directional LBT cannot be adopted for the transmitter. For another example, the transmitter can utilize the beamforming based directional LBT only if the antenna can be configured to transmit/receive in a narrow beam with beam width/angle smaller than a threshold. If multiple schemes are supported, the transmitter can choose to switch among the schemes.

Figure 15:
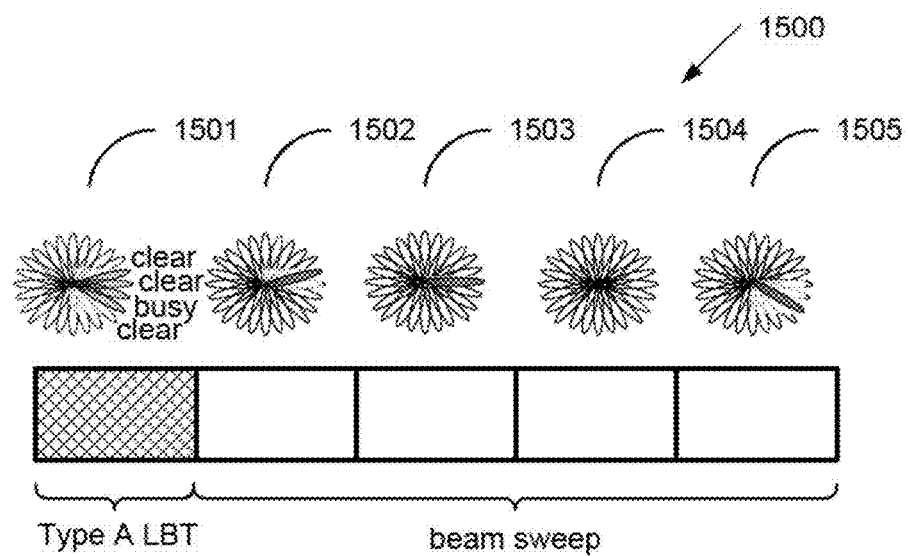
FIG. 15 illustrates an example directional LBT based transmission including discovery signal according to embodiments of the present disclosure.

FIG. 15 illustrates an example directional LBT based transmission including discovery signal 1500 according to embodiments of the present disclosure. The embodiment of the directional LBT based transmission including discovery signal 1500 illustrated in FIG. 15 is for illustration only.

In one embodiment of scheme 6, the transmitter may transmit (1502, 1503, 1505) discovery signals using beam sweeping after Type A LBT completes (1501). The discovery signals can contain all the SS/PBCH blocks within a SS/PBCH burst set, or only contain part of the SS/PBCH blocks within a SS/PBCH burst set (e.g. SS/PBCH blocks within a predefined period). In one embodiment, the transmitter can transmit discovery signals only after all sensed directions are detected to be clear in the Type A LBT. In another embodiment, the transmitter can transmit discovery signals to a subset of all sensed directions if only those directions within the subset are detected to be clear (in this case, transmission/beam sweeping to the directions detected to be busy can be left as empty, e.g. 1504). One example this scheme is, the DRS containing the whole SS/PBCH burst set is divided into the multiple segments, where each segment corresponds to a period of time unit which is compatible with the MCOT of the Type A LBT, e.g. 1 ms contains 2 or 4 SS/PBCH blocks (depending on the subcarrier spacing utilized). Then, multiple segments of beam sweeping are performed, wherein each of them is after the Type A directional LBT.

Figure 16:
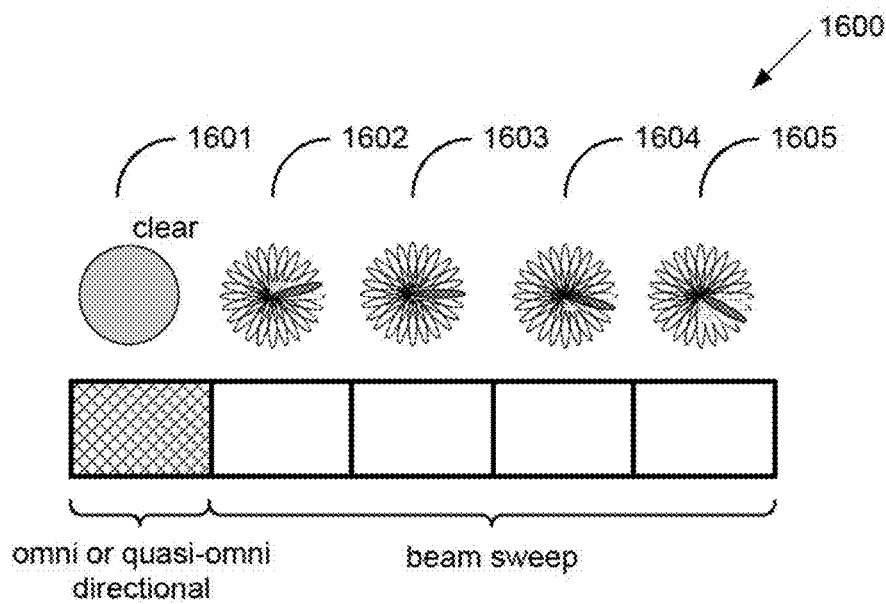
FIG. 16 illustrates another example directional LBT based transmission including discovery signal according to embodiments of the present disclosure.

FIG. 16 illustrates another example directional LBT based transmission including discovery signal 1600 according to embodiments of the present disclosure. The embodiment of the directional LBT based transmission including discovery signal 1600 illustrated in FIG. 16 is for illustration only.

In one embodiment of scheme 7, the transmitter may transmit (1602, 1603, 1604, 1605) discovery signals using beam sweeping after (quasi-) omni-directional LBT over a short period completes (1601). The discovery signals can contain all the SS/PBCH blocks within a SS/PBCH burst set, or only contain part of the SS/PBCH blocks within a SS/PBCH burst set (e.g. SS/PBCH blocks within a predefined period). Note that the LBT parameters (e.g. including sensing duration and CCA threshold) can be the same or different from the ones of Type A LBT in Scheme 6. One example this scheme is, the DRS containing the whole SS/PBCH burst set is divided into the multiple segments, where each segment corresponds to a period of time unit which is compatible with the MCOT of the omni-directional LBT, e.g. 1 ms contains 2 or 4 SS/PBCH blocks (depending on the subcarrier spacing utilized). Then, multiple segments of beam sweeping are performed, wherein each of them is after the LBT.

Figure 17:
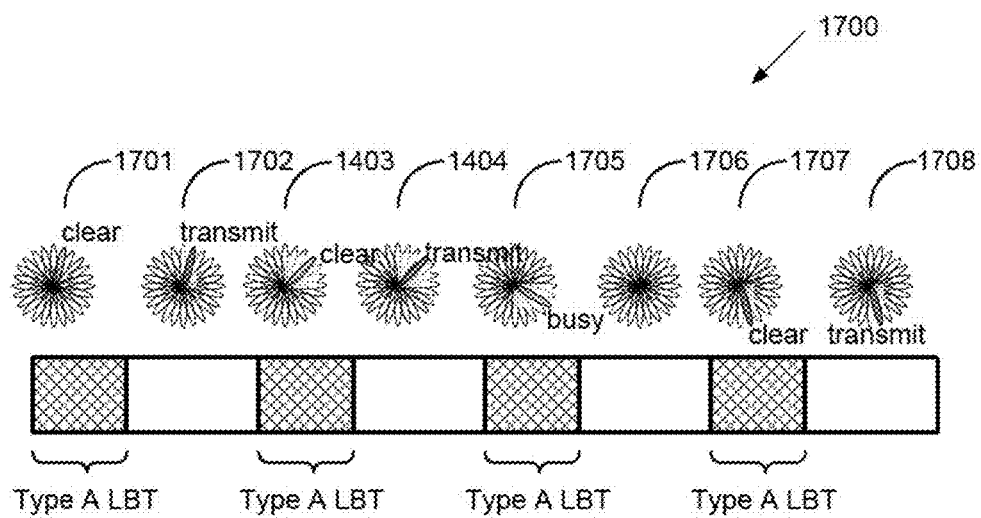
FIG. 17 illustrates yet another example directional LBT based transmission including discovery signal according to embodiments of the present disclosure.

FIG. 17 illustrates yet another example directional LBT based transmission including discovery signal 1700 according to embodiments of the present disclosure. The embodiment of the directional LBT based transmission including discovery signal 1700 illustrated in FIG. 17 is for illustration only.

In one embodiment of scheme 8, the transmitter may transmit (1702, 1704, 1708) discovery signals using beam sweeping after Type A directional LBTs complete (1701, 1703, 1707). The discovery signals can contain all the SS/PBCH blocks within a SS/PBCH burst set, or only contain part of the SS/PBCH blocks within a SS/PBCH burst set (e.g. SS/PBCH blocks within a predefined period). Note that the LBT parameters (e.g. including sensing duration and CCA threshold) can be the same or different from the ones of Type A LBT in Scheme 6 and the ones of (quasi-) omni-directional LBT in Scheme 7. Transmission/beam sweeping to the directions detected to be busy (1705) can be left as empty (1706). Note that this scheme can be combined with flexible TTI to minimize the gap between the completion of LBT and starting of beamformed transmission of discovery signals. The sensing duration in this scheme can be minimized since the transmission duration of each beam is short. For example, only at least $T_s$ sensing duration (possibly combined with other gap without sensing) is needed in Scheme 8, which is shorter comparing to Scheme 6.

Figure 18:
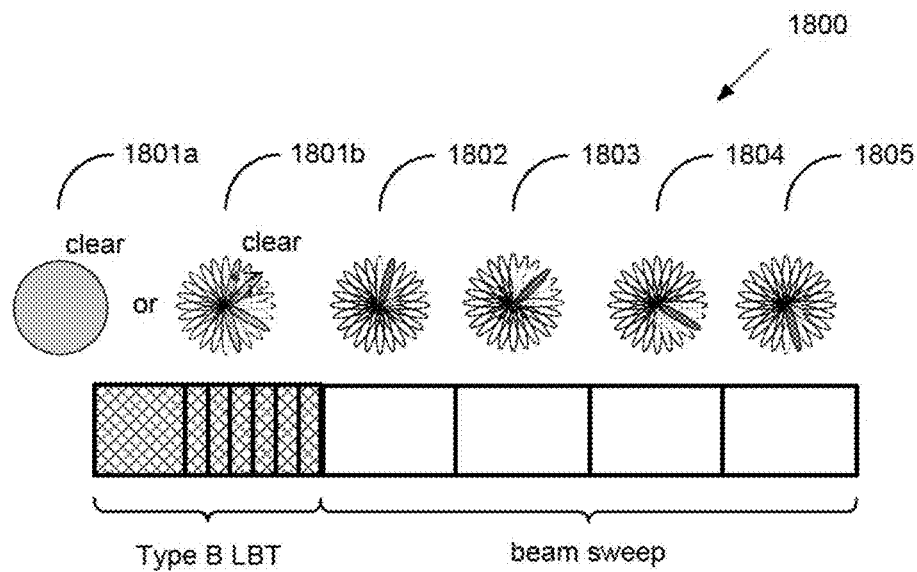
FIG. 18 illustrates yet another example directional LBT based transmission including discovery signal according to embodiments of the present disclosure.

FIG. 18 illustrates yet another example directional LBT based transmission including discovery signal 1800 according to embodiments of the present disclosure. The embodiment of the directional LBT based transmission including discovery signal 1800 illustrated in FIG. 18 is for illustration only.

In one embodiment of scheme 9, the transmitter may transmit (1802, 1803, 1804, 1805) discovery signals using beam sweeping after Type B (quasi-) omni-directional LBT or directional LBT (1801a or 1801b). The discovery signals can contain all the SS/PBCH blocks within a SS/PBCH burst set, or only contain part of the SS/PBCH blocks within a SS/PBCH burst set (e.g. SS/PBCH blocks within a predefined period). One example this scheme is, the DRS containing the whole SS/PBCH burst set is divided into the multiple segments, where each segment corresponds to a period of time unit which is compatible with the MCOT of the Type B directional LBT, e.g. 2 ms contains 4 or 8 SS/PBCH blocks (depending on the subcarrier spacing utilized). Then, multiple segments of beam sweeping are performed, wherein each of them is after the Type B directional LBT.

In some embodiments, if full duplex is supported at the transmitter, channel sensing and transmission can be performed at the same time. In this case, parts of sensed directions are detected to be clear in the LBT, the transmitter can begin transmission on those directions detected to be clear, and keep sensing on the remaining directions wherein the LBT does not complete. This embodiment can be applied to all schemes proposed for directional LBT based transmission including data transport block. For example, if Type B directional LBT completes only in part of the sensed directions (e.g. some backoff counters reach zero while the remaining ones do not), the transmitter can start transmission on those directions, and continue the LBT procedures on the remaining directions. If part or all of the remaining directions are detected to be clear later, the transmitter can start transmission on those directions as well. In this way, effort to align the transmission to different directions can be reduced, e.g. reservation signal or self-defer may not be needed or may be minimized.

Figure 19:
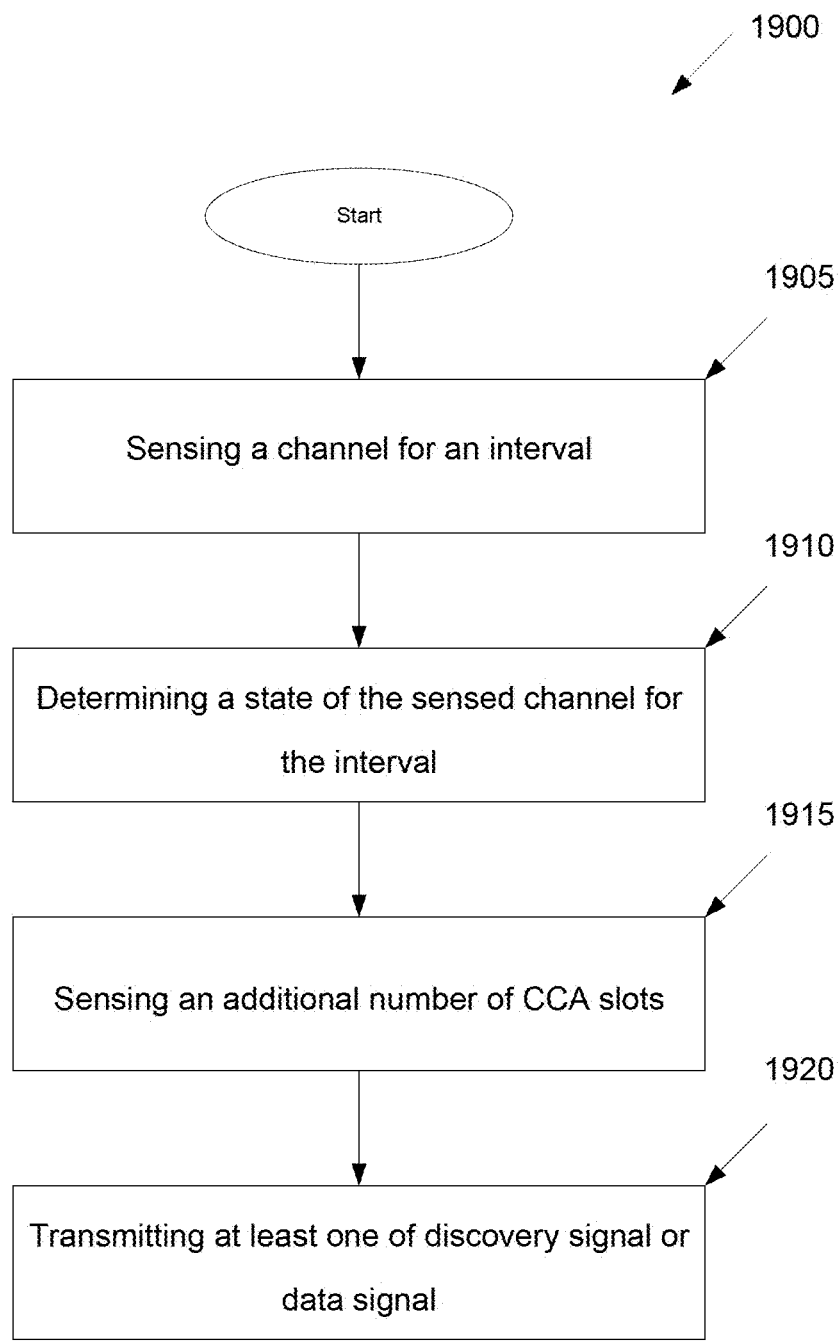
FIG. 19 illustrates a flow chart of a method for multi-beam operation according to embodiments of the present disclosure.

FIG. 19 illustrates a flow chart of a method 1900 for multi-beam operation, as may be performed by a transmit apparatus, according to embodiments of the present disclosure. The embodiment of the method 1900 illustrated in FIG. 19 is for illustration only.

As shown in FIG. 18, the method 1900 begins step 1905. In step 1905, the transmit apparatus senses a channel for an interval comprising at least one clear channel assessment (CCA) slot.

Next, the transmit apparatus in step 1910 determines whether a state of the sensed channel for the interval is an idle state based on a configurable energy threshold.

Subsequently, in step 1915, the transmit apparatus senses an additional number of CCA slots when the state of the sensed channel is determined as the idle state based on the configurable directional energy threshold. In some embodiments, the transmit apparatus, in step 1915, determines whether the state of the sensed channel is the idle state based on a configurable directional energy threshold. In some embodiments, the transmit apparatus, in step 1915, determines at least one non-sensing duration included in the CCA slot, wherein the at least one non-sensing duration is immediately followed by at least one sensing duration and determining whether a state of the at least one sensing duration is an idle state based on a directional energy threshold. In some embodiments, the transmit apparatus determines at least one backoff counter to be used to sense the channel transmitted from one or more antenna directions, wherein the backoff counter is configured by at least one of a pre-determined value or the transmit apparatus using a higher layer signaling. In some embodiments, the transmit apparatus, in step 1915, configures the directional energy threshold based on at least one of one or more antenna directions or a width of each of the one or more antenna directions.

Finally, the transmit apparatus in step 1920 transmits at least one of discovery signal or data signal when all states of the sensed additional number of CCA slots are determined as the idle state based on the configurable directional energy threshold. In step 1910, the, the transmit apparatus transmits at least one of discovery signal or data signal when the state of the sensed channel for the interval is determined as the idle state. In some embodiments, the transmit apparatus, in step 1920, transmits a first portion of a data transport block including a transmit time interval (TTI) within a maximum channel occupancy time (MCOT), wherein the directional LBT operation is applied before the first portion of the data transport block and transmits a second portion of the data transport block for a data transmission within the MCOT comprising a set of TTIs each of which includes a beginning portion associated with another directional LBT operation, In such embodiments, the directional LBT operation used for the first portion of the data transport block is different than or a same as the other directional LBT operation used for the second portion of the data transport block.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A transmit apparatus for a directional listen-before-talk (LBT) operation in a wireless communication system, the transmit apparatus comprising:
at least one processor configured to:
sense a channel for an interval comprising at least one clear channel assessment (CCA) slot;
determine whether a state of the sensed channel for the interval is an idle state based on a configurable directional energy threshold; and
sense an additional number of CCA slots when the state of the sensed channel is determined as the idle state based on the configurable directional energy threshold; and
a transceiver configured to transmit, to a receive apparatus, at least one of discovery signal or data signal when states of the sensed additional number of CCA slots are determined as the idle state based on the configurable directional energy threshold.

2. The transmit apparatus of claim 1, wherein:
the at least one processor is further configured to determine whether the state of the sensed channel is the idle state based on a configurable directional energy threshold; and
the transceiver is further configured to transmit, to the receive apparatus, at least one of discovery signal or data signal when the state of the sensed channel for the interval is determined as the idle state based on the configurable directional energy threshold.

3. The transmit apparatus of claim 1, wherein the at least one processor is further configured to:
determine at least one non-sensing duration included in the CCA slot, wherein the at least one non-sensing duration is immediately followed by at least one sensing duration; and
determine whether a state of the at least one sensing duration is an idle state based on a configurable directional energy threshold.

4. The transmit apparatus of claim 1, wherein the at least one processor is further configured to configure the configurable directional energy threshold based on at least one of one or more antenna directions or a width of each of the one or more antenna directions.

5. The transmit apparatus of claim 1, wherein the at least one processor is further configured to determine at least one backoff counter to be used to sense the channel transmitted from one or more antenna directions, the backoff counter being configured by at least one of a pre-determined value or the transmit apparatus using a higher layer signaling.

6. The transmit apparatus of claim 1, wherein the transceiver is further configured to:
transmit, to the receive apparatus, a first portion of a data transport block including a transmit time interval (TTI) within a maximum channel occupancy time (MCOT), the directional LBT operation being applied before the first portion of the data transport block; and transmit a second portion of the data transport block for a data transmission within the MCOT comprising a set of TTIs each of which includes a beginning portion associated with another directional LBT operation, and wherein the directional LBT operation used for the first portion of the data transport block is different than or a same as the other directional LBT operation used for the second portion of the data transport block.

7. The transmit apparatus of claim 6, wherein:
the transceiver is further configured to transmit the data transport block for a transmission of the discovery signal, the directional LBT operation being applied to each of the set of TTIs or a group of TTIs included in the data transport block; and
the at least one processor is further configured to perform a beam sweeping when the directional LBT operation is completed at each of the set of TTIs or the group of TTIs.

8. A receive apparatus for a directional listen-before-talk (LBT) operation in a wireless communication system, the receive apparatus comprising:
at least one processor configured to:
sense a channel for an interval comprising at least one clear channel assessment (CCA) slot;
determine whether a state of the sensed channel for the interval is an idle state based on a configurable directional energy threshold; and
sense an additional number of CCA slots when the state of the sensed channel is determined as the idle state based on the configurable directional energy threshold; and
a transceiver configured to receive, from a transmit apparatus, at least one of discovery signal or data signal when states of the sensed additional number of CCA slots are determined as the idle state based on the configurable directional energy threshold.

9. The receive apparatus of claim 8, wherein:
the at least one processor is further configured to determine whether the state of the sensed channel is the idle state based on a configurable directional energy threshold; and
the transceiver is further configured to receive, from the transmit apparatus, at least one of discovery signal or data signal when the state of the sensed channel for the interval is determined as the idle state based on the configurable directional energy threshold.

10. The receive apparatus of claim 8, wherein the at least one processor is further configured to:
determine at least one non-sensing duration included in the CCA slot, wherein the at least one non-sensing duration is immediately followed by at least one sensing duration; and
determine whether a state of the at least one sensing duration is an idle state based on a configurable directional energy threshold.

11. The receive apparatus of claim 8, wherein the at least one processor is further configured to:
configure the configurable directional energy threshold based on at least one of one or more antenna directions or a width of each of the one or more antenna directions; and
determine at least one backoff counter to be used to sense the channel transmitted from one or more antenna directions, the backoff counter being configured by at least one of a pre-determined value or the transmit apparatus using a higher layer signaling.

12. The receive apparatus of claim 8, wherein the transceiver is further configured to:
receive, to the transmit apparatus, a first portion of a data transport block including a transmit time interval (TTI) within a maximum channel occupancy time (MCOT), the directional LBT operation being applied before the first portion of the data transport block; and
receive a second portion of the data transport block for a data transmission within the MCOT comprising a set of TTIs each of which includes a beginning portion associated with another directional LBT operation, and wherein the directional LBT operation used for the first portion of the data transport block is different than or a same as the other directional LBT operation used for the second portion of the data transport block.

13. The receive apparatus of claim 12, wherein:
the transceiver is further configured to receive the data transport block for a transmission of the discovery signal, the directional LBT operation being applied to each of the set of TTIs or a group of TTIs included in the data transport block; and
the at least one processor is further configured to perform a beam sweeping when the directional LBT operation is completed at each of the set of TTIs or the group of TTIs.

14. A method of a transmit apparatus for a directional listen-before-talk (LBT) operation in a wireless communication system, the method comprising:
sensing a channel for an interval comprising at least one clear channel assessment (CCA) slot;
determining whether a state of the sensed channel for the interval is an idle state based on a configurable directional energy threshold;
sensing an additional number of CCA slots when the state of the sensed channel is determined as the idle state based on the configurable directional energy threshold; and
transmitting, to a receive apparatus, at least one of discovery signal or data signal when all states of the sensed additional number of CCA slots are determined as the idle state based on the configurable directional energy threshold.

15. The method of claim 14, further comprising:
determining whether the state of the sensed channel is the idle state based on a configurable directional energy threshold; and
transmitting, to the receive apparatus, at least one of discovery signal or data signal when the state of the sensed channel for the interval is determined as the idle state based on the configurable directional energy threshold.

16. The method of claim 14, further comprising:
determining at least one non-sensing duration included in the CCA slot, wherein the at least one non-sensing duration is immediately followed by at least one sensing duration; and
determining whether a state of the at least one sensing duration is an idle state based on a configurable directional energy threshold.

17. The method of claim 14, wherein determining whether the state of the at least one sensing duration further comprises configuring the configurable directional energy threshold based on at least one of one or more antenna directions or a width of each of the one or more antenna directions.

18. The method of claim 14, further comprising determining at least one backoff counter to be used to sense the channel transmitted from one or more antenna directions, wherein the backoff counter is configured by at least one of a pre-determined value or the transmit apparatus using a higher layer signaling.

19. The method of claim 14, further comprising:
- transmitting, to the receive apparatus, a first portion of a data transport block including a transmit time interval (TTI) within a maximum channel occupancy time (MCOT), wherein the directional LBT operation is applied before the first portion of the data transport block; and
- transmitting a second portion of the data transport block for a data transmission within the MCOT comprising a set of TTIs each of which includes a beginning portion associated with another directional LBT operation,
- wherein the directional LBT operation used for the first portion of the data transport block is different than or a same as the other directional LBT operation used for the second portion of the data transport block.

20. The method of claim 19, further comprising:
- transmitting the transport block for a transmission of the discovery signal, wherein the directional LBT operation is applied to each of the set of TTIs or a group of TTIs included in the transport block; and
- performing a beam sweeping when the directional LBT operation is completed at each of the set of TTIs or the group of TTIs.

* * * * *